US012687047B2

(12) United States Patent　　　　(10) Patent No.:　US 12,687,047 B2

Renner et al.　　　　　　　　　　　(45) Date of Patent:　　　Jul. 21, 2026

(54) DOOR LOCKING SYSTEM WITH A RAPID RELEASE MECHANISM

(71) Applicant: AIRBUS HELICOPTERS DEUTSCHLAND GMBH, Donauworth (DE)

(72) Inventors: Uwe Renner, Friedberg (DE); Xaver Pascoe, Munich (DE); Markus Buehlmeyer, Buttenwiesen (DE); Thomas Tendyra, Schwenningen (DE); Stephen Ward, Donaumuenster (DE); Guido Borchers, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 853 days.

(21) Appl. No.: 16/686,736

(22) Filed: Nov. 18, 2019

(65) Prior Publication Data

US 2020/0224462 A1　　　Jul. 16, 2020

(30) Foreign Application Priority Data

Jan. 16, 2019　(EP) ..................................... 19400001

(51) Int. Cl.
　　*E05B 77/54*　　　　(2014.01)
　　*B64C 1/14*　　　　(2006.01)
　　　　　　(Continued)

(52) U.S. Cl.
　　CPC ............ *E05B 77/54* (2013.01); *B64C 1/1407* (2013.01); *E05B 47/026* (2013.01); (Continued)

(58) Field of Classification Search
　　CPC ................... E05B 77/54; E05B 47/026; E05B 2047/0086; E05B 2047/0067; E05B 81/16; (Continued)

(56) References Cited

U.S. PATENT DOCUMENTS 6,677,844 B1　　1/2004　Gorospe et al.
6,902,137 B2　　6/2005　Brzeski et al.
　　　　　(Continued)

FOREIGN PATENT DOCUMENTS

DE　　　　　2554174 A1 *　6/1977　........... E05B 63/248
DE　　102005057108 A1 *　5/2007　........... E05B 15/101
　　　　　　(Continued)

OTHER PUBLICATIONS

European Search Report for European Application No. EP 19400001. 4, Completed by the European Patent Office, Dated Jun. 4, 2019, 7 pages.

*Primary Examiner* — Christine M Mills
*Assistant Examiner* — Peter H Watson
(74) *Attorney, Agent, or Firm* — Brooks Kushman P.C.

(57)　　　　　　ABSTRACT

A door locking system for a door module that separates compartments in an aircraft. Door locking system has locking element that is adapted to maintain door panel of door module in a closed position. Door locking system further includes first and second mechanisms that are adapted to release door panel from the closed position in a normal and an abnormal mode, respectively. Second mechanism is spatially segregated from and operates independently of first mechanism. Second mechanism includes locking element release actuator, pressure sensor, and controller that directs locking element release actuator to act on locking element (Continued)

when pressure sensor detects a difference in pressure between the compartments that exceeds a predetermined threshold.

15 Claims, 9 Drawing Sheets

(51) Int. Cl.

| | |
|---|---|
| *E05B 47/00* | (2006.01) |
| *E05B 47/02* | (2006.01) |
| *E05B 51/02* | (2006.01) |
| *E05B 63/24* | (2006.01) |
| *E05B 81/18* | (2014.01) |
| *E05B 81/64* | (2014.01) |

(52) U.S. Cl.
CPC .......... *E05B 51/023* (2013.01); *E05B 63/248* (2013.01); *E05B 81/18* (2013.01); *E05B 81/64* (2013.01); *B64C 1/1469* (2013.01); *E05B 2047/0067* (2013.01); *E05B 2047/0086* (2013.01); *E05Y 2800/252* (2013.01); *E05Y 2900/502* (2013.01)

(58) Field of Classification Search
CPC ......... E05B 81/18; E05B 81/64; E05B 83/36; E05B 83/42; E05B 17/0037; E05B 17/2038; E05B 15/04; E05B 63/18; E05B 63/185; E05B 51/02; E05B 63/248; Y10S 292/65; E05C 1/085

USPC ........................................ 292/163, 144, 150
See application file for complete search history.

(56) References Cited

U.S. PATENT DOCUMENTS

| | | | | |
|---|---|---|---|---|
| 8,398,025 B2 * | 3/2013 | Piorkowski | .......... | G07C 9/0069 |
| | | | | 244/129.5 |
| 2003/0090113 A1 * | 5/2003 | Piorkowski | ............... | E05C 1/16 |
| | | | | 292/139 |
| 2004/0046084 A1 * | 3/2004 | Brzeski | ................. | E05B 51/023 |
| | | | | 244/129.5 |
| 2004/0061027 A1 * | 4/2004 | Movsesian | ......... | B64D 45/0029 |
| | | | | 244/129.1 |
| 2004/0094670 A1 | 5/2004 | Pratt et al. | | |
| 2005/0012343 A1 * | 1/2005 | Warden | ............... | E05B 65/1053 |
| | | | | 292/144 |
| 2019/0352946 A1 * | 11/2019 | Yadollahi | .............. | B64C 1/1461 |

FOREIGN PATENT DOCUMENTS

| | | | | | |
|---|---|---|---|---|---|
| DE | 102008017200 A1 * | 10/2009 | | .......... | E05B 51/023 |
| EP | 2410113 A2 | 1/2012 | | | |
| EP | 2410113 A3 | 12/2014 | | | |
| GB | 2419158 A | 4/2006 | | | |
| RU | 2467920 C1 | 11/2012 | | | |
| WO | 8401404 A1 | 4/1984 | | | |

* cited by examiner

Fig. 3

Section A-A

424 LSC

430

420

423 DRC

Figure 7:
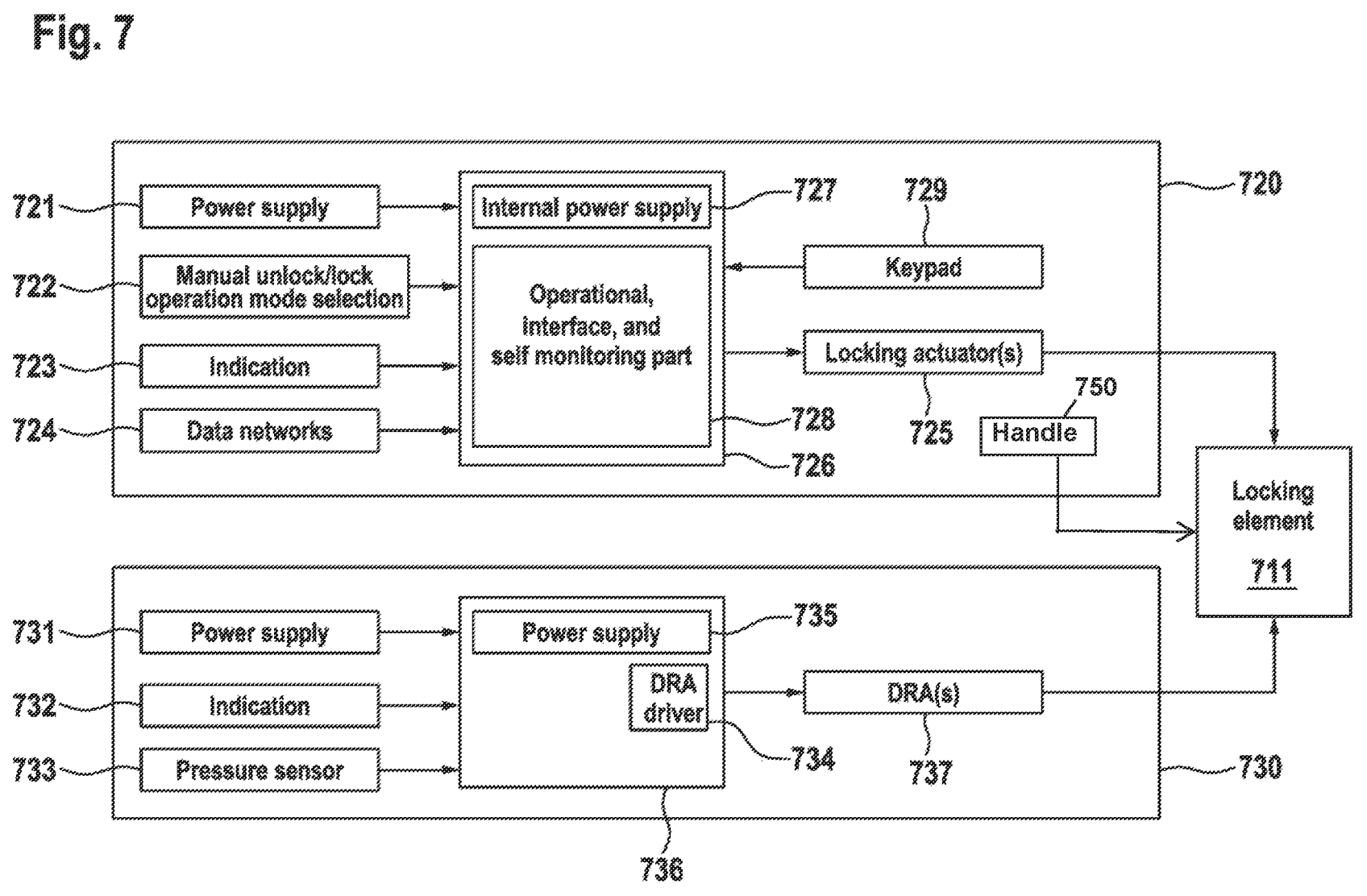

Locking element 711

720

750

Handle

Keypad 729

Locking actuator(s) 725

727 Internal power supply

728

726

Operational, interface, and self monitoring part

721 Power supply

722 Manual unlock/lock operation mode selection

723 Indication

724 Data networks

730

DRA(s) 737

735 Power supply

DRA driver 734

736

731 Power supply

732 Indication

733 Pressure sensor

Fig. 8

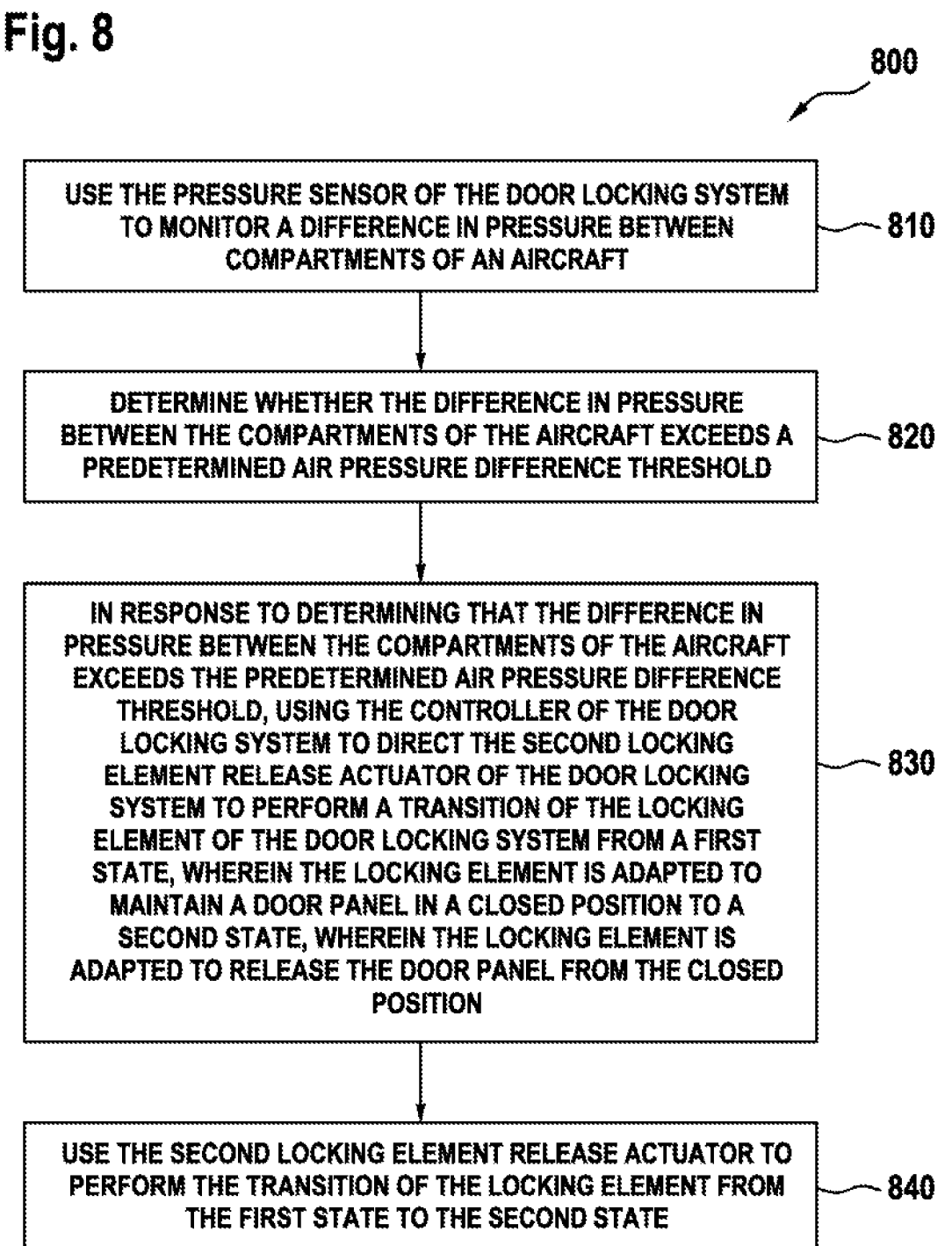

800

USE THE PRESSURE SENSOR OF THE DOOR LOCKING SYSTEM
TO MONITOR A DIFFERENCE IN PRESSURE BETWEEN
COMPARTMENTS OF AN AIRCRAFT                                    810

DETERMINE WHETHER THE DIFFERENCE IN PRESSURE
BETWEEN THE COMPARTMENTS OF THE AIRCRAFT EXCEEDS A
PREDETERMINED AIR PRESSURE DIFFERENCE THRESHOLD              820

IN RESPONSE TO DETERMINING THAT THE DIFFERENCE IN
PRESSURE BETWEEN THE COMPARTMENTS OF THE AIRCRAFT
EXCEEDS THE PREDETERMINED AIR PRESSURE DIFFERENCE
THRESHOLD, USING THE CONTROLLER OF THE DOOR
LOCKING SYSTEM TO DIRECT THE SECOND LOCKING
ELEMENT RELEASE ACTUATOR OF THE DOOR LOCKING
SYSTEM TO PERFORM A TRANSITION OF THE LOCKING               830
ELEMENT OF THE DOOR LOCKING SYSTEM FROM A FIRST
STATE, WHEREIN THE LOCKING ELEMENT IS ADAPTED TO
MAINTAIN A DOOR PANEL IN A CLOSED POSITION TO A
SECOND STATE, WHEREIN THE LOCKING ELEMENT IS
ADAPTED TO RELEASE THE DOOR PANEL FROM THE CLOSED
POSITION

USE THE SECOND LOCKING ELEMENT RELEASE ACTUATOR TO
PERFORM THE TRANSITION OF THE LOCKING ELEMENT FROM          840
THE FIRST STATE TO THE SECOND STATE

DOOR LOCKING SYSTEM WITH A RAPID RELEASE MECHANISM

CROSS-REFERENCE TO RELATED APPLICATIONS

This application claims priority to European patent application No. EP 19400001.4 filed on Jan. 16, 2019, the disclosure of which is incorporated in its entirety by reference herein.

BACKGROUND OF THE INVENTION

(1) Field of the Invention

The present embodiments relate to a door locking system in an aircraft, and, more particularly, to a door locking system for a door that separates compartments in an aircraft and has a rapid release mechanism for opening the door in case of a decompression between the compartments of the aircraft.

(2) Description of Related Art

Most separations that separate different compartments of an aircraft include a door to provide access from one compartment to the other compartment. For example, due to safety concerns, commercial aircrafts usually have a door that separates the cockpit (i.e., the pilot area) from the cabin (i.e., the passenger area). The door that separates the cockpit from the cabin is sometimes also referred to as the cockpit door.

When cruising at high altitudes, the cockpit and cabin of aircrafts are usually pressurized at a pressure that is higher than the ambient pressure. In some situations, the pressure in the cockpit may drop rapidly and become much lower than the pressure in the cabin. For example, a bird may strike and break a cockpit window causing such a rapid pressure drop in the cockpit. In this case, a fast, decompression of the cabin is necessary to avoid an aggravating of the situation in which the structural loads of the aircraft could reach its load limits ultimately resulting in the crash of the aircraft.

Generally, the cockpit door aboard the aircraft provides the primary means of dissipating pressure from the cabin to the cockpit during a cockpit decompression case. A cockpit decompression case may occur as a minimal opening involving relatively slow bleed pressure or as a maximum opening involving a rapid loss of pressure.

To ensure that the difference in pressure between the cabin and the cockpit does not exceed structural limitations of the aircraft, the cockpit door must be released and opened within a short time period. The time for opening the cockpit door includes the time for releasing the door lock and the time for rotating the door into the opened position.

To satisfy certification requirements defined by aviation authorities, it has to be demonstrated that an aircraft can sustain a decompression case without a subsequent loss of essential structure/equipment and life. For example, JAR 25.365(e) (2) specifies that the aircraft structure must be able to withstand the depressurization caused by an instant opening of a predetermined area in the pressurized shell at any operating altitude.

Some prior solutions have an electromechanical system. The electromechanical system is usually used for both, the normal door panel operation of locking and unlocking, as well as the abnormal unlocking in the decompression case. Widely known are electronic controllers within these electromechanical systems that combine all the needed functionality within one device/and locking actuators (e.g., spring loaded solenoids) that are steered by those controllers.

These electromechanical systems are usually required to operate the door and/or the door panel in case of a power loss. Therefore, a push back spring is often provided that overrides the slow fading magnetic fields and the inertia of all moveable parts.

Document U.S. Pat. No. 6,902,137 B2 describes a door latch mechanism that is mounted in a door frame and cooperates with a door bolt separating the cockpit compartment on an aircraft from the passenger compartment. The mechanism prevents a hijacker from entering the cockpit compartment and allows the door to open rapidly when a catastrophic decompression event occurs in the airplane. In particular, the mechanism that is to be mounted in a door frame to cooperate with a door latch on a door includes a support, a catch, a biasing element, a pin, a pressure responsive sensor, a first roller, and a second roller. The catch is moveably mounted on the support in position to engage the door latch to hold the door closed. The biasing element is urging the catch into position to hold the door closed. The pin is having a locking position in which it prevents the catch from moving out of the door closed position. The pressure responsive sensor is initiating action to move the pin into an unlocked position permitting the catch to move when a sudden change in air pressure on one side of the door occurs, thus allowing the door to open. The first roller is mounted on said catch to engage one side of the pin when an opening force is applied to the door, and the second roller is rotatably mounted on said support, and engaging an opposite side of the pin to receive a load applied to the catch, said first and second rollers being mounted to be in rolling engagement with said pin to aid in movement of said pin when it is being moved to the unlocked position.

Document U.S. Pat. No. 6,677,844 B1 describes a quick-return electro-mechanical actuator that broadly includes a cocking solenoid and a holding solenoid. Each of the solenoids has an armature and a rod. The rods are adapted to contact one another when the actuator is energized. However, after the second rod has been moved to its extended position, the cocking coil is de-energized. The mass of the first rod and first armature is thereafter uncoupled and separated from the mass of the second rod and second armature such that when the second coil is subsequently de-energized, a spring will expand to quickly move the second rod from its extended position to its retracted position.

Document US 2004/0094670 A1 describes a method and apparatus for maintaining a panel in a closed position and releasing a panel upon application of changes resulting from a pressure change in an area adjoining the panel. The apparatus includes a latch mechanism attached to a structure that comprises a bolt for engaging a corresponding panel. The latch mechanism may be retained on the corresponding panel with the bolt engaging the structure. A pressure responsive device is provided to detect a change in pressure on one side of the panel and facilitating release of the bolt in response to a pressure change of a predetermined range or force. The latch mechanism and pressure responsive device vent to or communicate with only one side of the panel. A reservoir on one side of the panel communicates with a pressure responsive chamber of the pressure responsive device. The reservoir is generally on the same side of the panel to provide a pressure volume which is generally isolated from ambient pressure, such as during a decompression event. The method includes a method of maintaining a latch mechanism in a closed position subject to a pressure change, including sensing the pressure change on only one side of the panel.

Document RU 2 467 920 C1 describes a locking mechanism that comprises a spring-loaded holder and a retainer fitted on an axle casing. The retainer is composed of a two-arm lever while the holder represents a lug with flanges. Said flanges are composed of cylindrical rolls arranged on edges of the aforesaid lug on the retainer side to get in contact by outer surfaces with retainer arm that are furnished with an inner shoulder to hold the holder in an opened position by interaction with ledges arranged on the casing and to hold that holder in a closed position in interaction with the retainer arms. The pressure surface of the lug is provided with an elastic lining. The holder and the retainer are furnished with individual springs, whereas the holder spring force is lower than that of the retainer.

Governmental regulations require that every part, assembly, or device that is linked to the emergency release function has to fulfil the highest reliability value of 10E-9. Thus, a reasonable effort for documentation and certification has to be guaranteed in the field of aerospace equipment development. The rating and certification effort often implies a negative effect on cost and development schedule.

Moreover, most current solutions that open a door when a difference in pressure is detected are often complicated, heavy, and barely fast enough to unlock the door module within the required few milliseconds. For example, an activation device that uses a push back spring, as described in one of the solutions described above, has to be very powerful, and thus very heavy. Furthermore, such an activation device is notably noisy, which indicates dedicated measures for noise reduction.

BRIEF SUMMARY OF THE INVENTION

Based on the limitations and drawbacks of the prior art, an objective is to provide a door locking system for a door module that separates compartments of an aircraft. The door locking system should enable a rapid and reliable opening of the door when the air pressure difference between the areas that are separated by the door exceeds a predetermined threshold. The door locking system should have a simple and light-weight design, have less failure sources than current door locking systems, and be easy to install. The door locking system should use standard, off-the-shelf components, at least for the normal door panel opening and closing operation, which may lower the effort for documentation of this portion of the door locking system. The documents GB2419158, WO8401404 and EP2410113 were also cited.

This objective is solved by an apparatus comprising the features of claim 1.

More specifically, a door locking system for a door module that separates compartments of an aircraft and comprises a door panel and a door frame, comprises a locking element and first and second mechanisms. The locking element may have at least a first and a second state, wherein the locking element is adapted to maintain the door panel in a closed position in the first state, and wherein the locking element is adapted to release the door panel from the closed position in the second state. The first mechanism may enable a first movement of the door panel from the closed position to an opened position and a second movement of the door panel from the opened to the closed position. The first mechanism may include a first locking element release actuator that is coupled to the locking element and performs a first transition of the locking element from the first state to the second state. The second mechanism may enable a third movement of the door panel from the closed to the opened position, wherein the second mechanism is spatially segregated from the first mechanism and operates independently of the first mechanism. The second mechanism may include a second locking element release actuator that is coupled to the locking element and performs a second transition of the locking element from the first state to the second state, a pressure sensor that monitors a difference in pressure between the compartments of the aircraft, and a controller that is coupled to the pressure sensor and to the second locking element release actuator and that directs the second locking element release actuator to perform the second transition of the locking element from the first state to the second state when the difference in pressure between the compartments exceeds a predetermined threshold.

According to some embodiments, the normal door opening operations (e.g., a person wants to go through the door frame from one compartment to the other) and the abnormal door opening operations (e.g., in an emergency such as when a decompression accident occurs) may be segregated on the system level, by introducing two segregated mechanisms, a first mechanism that performs the normal door opening operations, and a second mechanism that performs the abnormal door opening operations.

According to some embodiments, dedicated release actuators and control units are used in the second mechanism. These dedicated release actuators and control units are not involved in the normal door opening operations.

According to some embodiments, the release actuators operate directly on a locking element, and are therefore small and highly reactive.

According to some embodiments, the release actuators are activated by a pyrotechnic piston device or by a solenoid.

According to some embodiments, at least a portion of the first mechanism is located in the door panel and at least a portion of the second mechanism is located in the door frame.

According to some embodiments, at least a portion of the first, mechanism is located in the door frame and at least a portion of the second mechanism is located in the door panel.

According to some embodiments, at least a portion of both, the first and second mechanisms, is located in the door panel.

According to some embodiments, at least a portion of both, the first and second mechanisms, is located in the door frame.

According to some embodiments, at least a portion of the locking element is located in the door panel.

According to some embodiments, at least a portion of the locking element is located in the door frame.

According to some embodiments, the segregation between the first and second mechanisms allows using lower grade components in the first mechanism, which lowers the effort for documentation and certification.

According to some embodiments, the segregation between the first and second mechanisms allows using a simple positive actuation device for pushing back the latching element, leading to a significantly faster release of the door panel in case of an emergency.

According to some embodiments, the second mechanism can be installed in an existing door module.

According to some embodiments, the segregation between first and second mechanisms allows an optimization of the first mechanism with regard to noise.

According to one aspect, at least a portion of at least one of the first mechanism or the second mechanism is located in the door panel.

According to one aspect, at least a portion of at least one of the first mechanism or the second mechanism is located in the door frame.

According to one aspect, the locking element, further comprises a latching element and a biasing element that biases the latching element such that the locking element is in the first state.

According to one aspect, the locking element further comprises at least one of a spring bolt lock, a solenoid bolt, or an electromagnetic lock.

According to one aspect, the locking element further comprises at least one of a spring, a solenoid bolt that fails closed, or a door closer.

According to one aspect, the first mechanism further comprises a keypad for entering a pin that actuates the first locking element release actuator.

According to one aspect, the second mechanism further comprises a power supply that is coupled to at least one of a release actuator driver, the pressure sensor, or the second locking element release actuator.

According to one aspect, the second locking element release actuator further comprises a movable pin and at least one of a solenoid or a pyrotechnical device, wherein the at least one of the solenoid or the pyrotechnical device pushes the movable pin against the locking element, thereby performing the second transition of the locking element from the first state to the second state.

According to one aspect, the pyrotechnical device further comprises a gas generator and an ignition unit that deploys a gas in the gas generator, wherein the gas pushes the movable pin against the locking element.

According to one aspect, the ignition unit receives a trigger signal from the controller and performs a chemical reaction that transforms an electrical energy associated with the trigger signal into thermal energy.

According to one aspect, the ignition unit uses the thermal energy to start a secondary reaction that deploys the gas.

According to one aspect, a current through the solenoid generates a magnetic field that pushes the movable pin against the locking element.

According to one aspect, the door locking system further comprises an electrically controlled switch that receives a trigger signal from the controller and enables a flow of the current through the solenoid based on the trigger signal.

Furthermore, a method for controlling a door locking system may include the operations of using the pressure sensor of the door locking system to monitor a difference in pressure between compartments of an aircraft; determining whether the difference in pressure between the compartments of the aircraft exceeds a predetermined air pressure difference threshold; in response to determining that the difference in pressure between the compartments of the aircraft exceeds the predetermined air pressure difference threshold, using the controller of the door locking system to direct the second locking element release actuator of the door locking system to perform a transition of the locking element of the door locking system from a first state, wherein the locking element is adapted to maintain a door panel in a closed position, to a second state, wherein the locking element is adapted to release the door panel from the closed position; and using the second locking element release actuator to perform the transition of the locking element from the first state to the second state.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 3 is a sectional view of an illustrative separation between compartments of an aircraft with a door module in a closed position and an opened position in accordance with some embodiments, FIG. 4A is a diagram of an illustrative door locking system chat includes a locking element that is in a first state in accordance with some embodiments, FIG. 4B is a diagram of an illustrative door locking system that includes a locking element that is in a second state in accordance with some embodiments, FIG. 7 is a diagram of an illustrative door locking system in accordance with some embodiments, and FIG. 8 is a diagram of a flowchart showing illustrative operations for operating a door locking system in accordance with some embodiments.

DETAILED DESCRIPTION OF THE INVENTION

Exemplary embodiments may be included in any vehicles with a door that separates two pressurized compartments, and in which a rapid change in pressure in only one of the compartments would compromise the structural integrity of the vehicle. Examples of such vehicles may include aircrafts such as airplanes, multicopters, helicopters, drones, etc.

Figure 1:
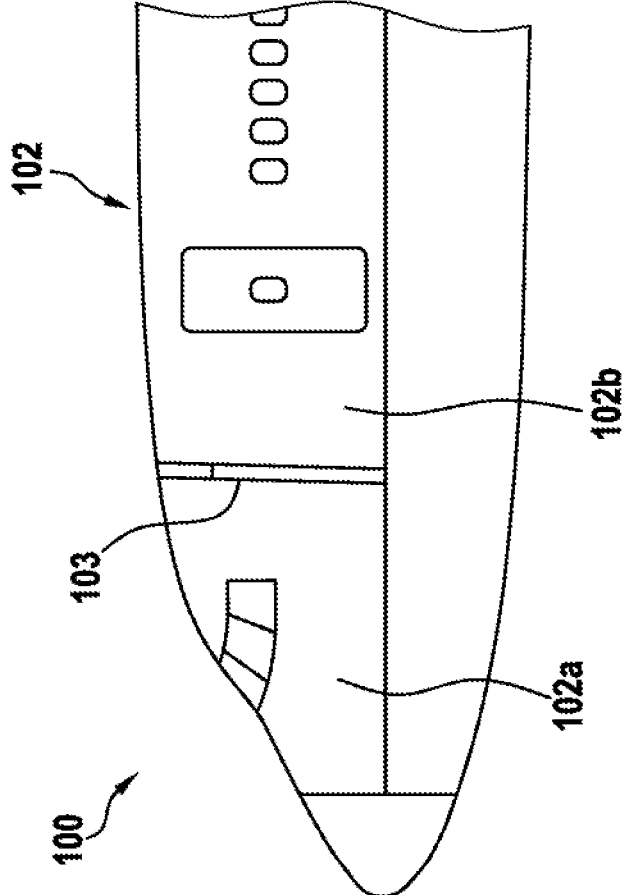
FIG. 1 is a diagram of an illustrative aircraft with a separation between compartments that includes a door module to provide access from one compartment to the other compartment and vice versa in accordance with some embodiments.

FIG. 1 shows an example of a vehicle 100. As shown in FIG. 1, vehicle 100 may be an aircraft, and, more particularly, an airplane. Aircraft 100 is exemplarily embodied with fuselage 102 that includes compartments 102a and 102b. A compartment separation 103 may separate compartments 102a and 102b of aircraft 100 from each other. Separation 103 may include a door module.

In some embodiments, compartments 102a, 102b may include the cockpit, the cabin, the cargo compartment, etc. As an example, the door module may provide access between the cockpit and the cabin of aircraft 100. As another example, the door module may provide access between the cockpit and the cargo compartment, or between the cabin and the cargo compartment.

If desired, the door module may provide a function for dissipating a pressure difference between compartments 102a and 102b of aircraft 100. For example, the door module may dissipate the pressure difference between compartments 102a and 102b in case of a rapid decompression of one of compartments 102a or 102b.

Rapid decompression may occur as the result of structural damage to one of compartments 102a or 102b. Releasing the door module from a closed position and enabling a rapid opening of the door module in case of a rapid loss of pressure in one of compartments 102a or 102b may prevent further damage to aircraft 100 by ensuring the establishment of equal pressure in both compartments 102a and 102b.

Figure 2:
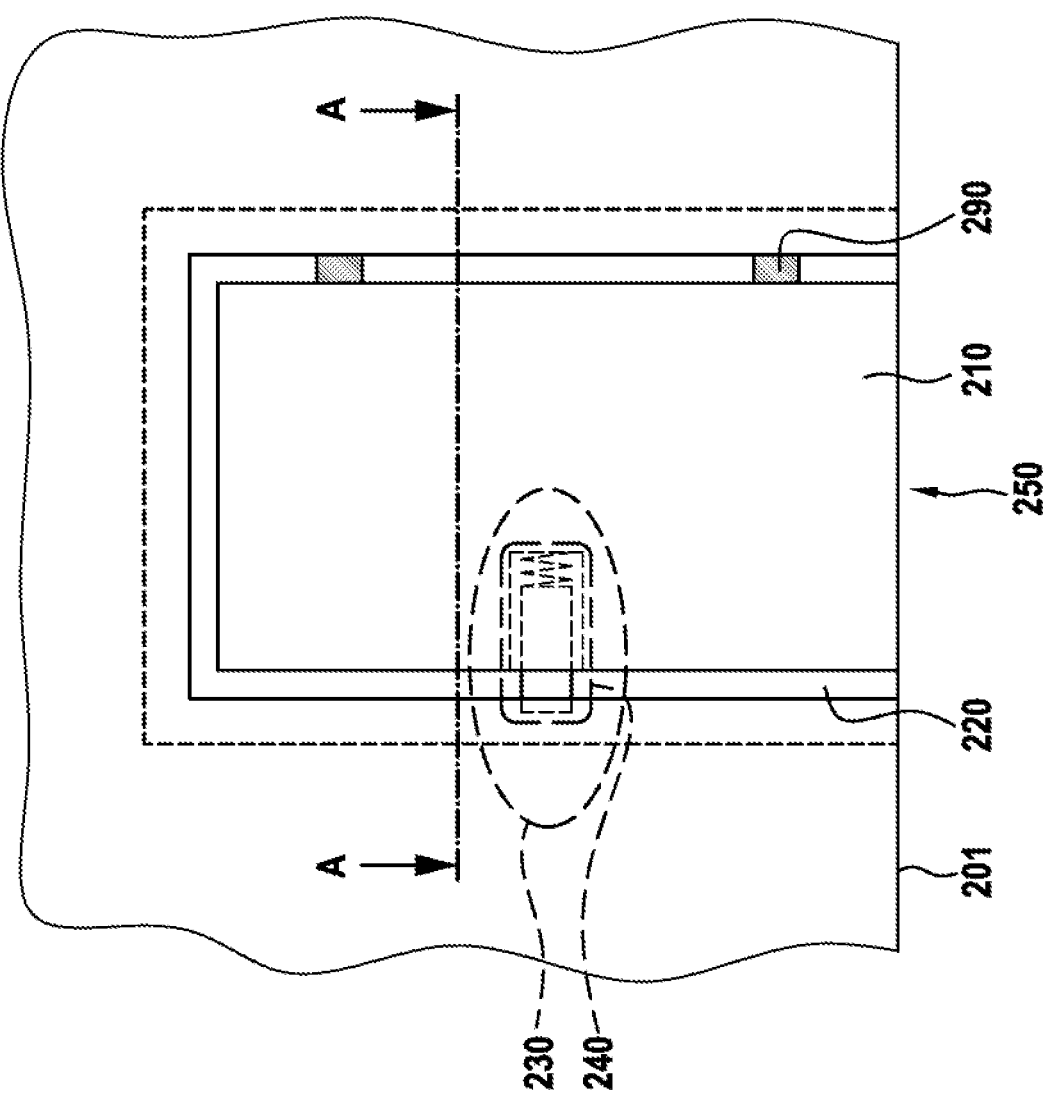
FIG. 2 is a diagram of an illustrative separation between compartments of an aircraft with a door module in accordance with some embodiments.

FIG. 2 shows an illustrative separation between compartments of an aircraft. Compartment separation 201 may have door module 250 that enables access from one compartment to the other. Door module 250 may include door panel 210, which is sometimes also referred to as a door blade, door frame 220 which is sometimes also referred to as a door post, and door locking system 230. Door module 250 may have no gaps between door panel 210 and door frame 220, if desired.

Door locking system 230 may have locking element. 240 that, when engaged between door frame 220 and door panel 210, keeps door panel 210 in a closed position in which door panel 210 prevents passage through door frame 220.

As shown, locking element 240 may be arranged on door panel 210. If desired, locking element 240 may be arranged at least partially on door frame 220 and/or in compartment separation 201.

Door locking system 230 may be adapted to control an opening and/or closing of door module 250 in a first mode, which is sometimes also referred to as a normal mode. For example, door locking system 230 may be adapted to control opening and/or closing of door module 250 to grant access to crew and/or passengers of an aircraft from one compartment to the other compartment.

In some embodiments, door locking system 230 may be adapted to control an opening of door module 250 in a second mode, which is sometimes also referred to as an abnormal mode or an emergency release mode. For example, door locking system 230 may be adapted to control an opening of door module 250 that separates compartments of an aircraft (e.g., compartments 102a, 102b of FIG. 1) under predetermined conditions. For example, door locking system 230 may control the opening of door module 250 if a predetermined air pressure difference threshold between the compartments is exceeded. Such a predetermined air pressure difference may be based on structural specifications of the aircraft and/or on regulations.

In some embodiments, door locking system 230 may include first and second mechanisms. The first mechanism may control opening and/or closing of door module 250 in the normal mode, while the second mechanism controls the opening of door module 250 in the abnormal mode. If desired, the first and second mechanisms may be segregated. In other words, first and second mechanisms may be spatially separated and components of the first mechanism may not operate in the second mechanism and components of the second mechanism may not operate in the first mechanism.

If desired, door locking system 230 may control the opening of door module 250 from a first position to a second position. For example, door locking system 230 may control the opening of door module 250 during a move of door panel 210 from a closed position (e.g., closed position 270 of FIG. 3), to an opened position (e.g., opened position 280 of FIG. 3).

Locking element 240 may have a first state and a second state. In the first state, locking element 240 may be adapted to maintain door panel 210 in a closed position. In other words, locking element 240 may maintain door panel 210 in a position in which door panel 210 closes door frame 220, thereby denying access through door frame 220. In the second state, locking element 240 may be adapted to release door panel 210 from the closed position.

In some embodiments, door locking system 230 may release door panel 210 from the closed position under predetermined conditions. For example, door locking system 230 may release door panel 210 from the closed position if a predetermined air pressure difference threshold between the compartments that are separated by compartment separation 201 is exceeded.

If desired, door locking system 230 may act on locking element 240 such that locking element 240 performs a transition from the first state to the second state, thereby releasing door panel 210 from the closed position. When door panel 210 is released from the closed position, door panel 210 may leave the closed position and move into an opened position.

Door panel 210 may be attached to door frame 220 by means of hinges 290. In some embodiments, hinges 290 may be located on one side of door panel 210 so that hinges 290 are inaccessible from the other side of door panel 210. For example, consider the scenario in which compartment separation 201 separates cabin and cockpit of an aircraft. In this scenario, it may be desirable to locate hinges 290 inside the cockpit to prevent access to hinges 290 from the cabin.

When mounted to door frame 220 by hinges, door panel 210 may move from the closed position to an opened position through rotation around an axis defined by hinges 290. In other words, door panel 210 may swing open.

The opening of door module 250 may ensure decompression of the compartment with the higher air pressure, thereby harmonizing the air pressure in one compartment with the air pressure in the other compartment. In some embodiments, door locking system 230 may ensure the opening of door panel 210 and thereby harmonization of the air pressure between the compartments within a predetermined time interval.

As an example, consider the scenario in which door module 250 separates a cockpit of an aircraft from a cabin of the aircraft. In other words, the compartments that are separated by compartment separation 201 are embodied by cockpit and cabin.

In some embodiments, door panel 210 and door frame 220 may allow the opening of door panel 210 toward the cockpit. It is understood that door panel 210 may be mounted on door frame 220 in a different way. As an example, the hinges may be located on the cabin side of door panel 210 and/or door panel 210 may open toward the cabin.

To satisfy current safety regulations for passenger aircraft, door module 250 may be locked (i.e., locking element 240 may maintain door panel 210 in a position in which door panel 210 closes door frame 220) as soon as the aircraft leaves the parking area and for the entire duration of the flight. Locking element 240 may include a set of electric strikers or bolts that is installed in the side of door panel 210 (i.e., at the edge of the door or near the edge of the door).

In a locked position, these strikers or bolts are inserted in tumblers mounted in door frame 220 or in openings of door frame 220 that are adapted to receive the strikers or bolts. If desired, the strikers or bolts may be controlled electrically. More specifically, the strikers or bolts may be powered continuously to ensure that locking element 240 maintains door panel 210 in a locked position. When the electric power supply is cut off, the strikers or bolts may slide toward an unlocked position, if desired.

Figure 3:
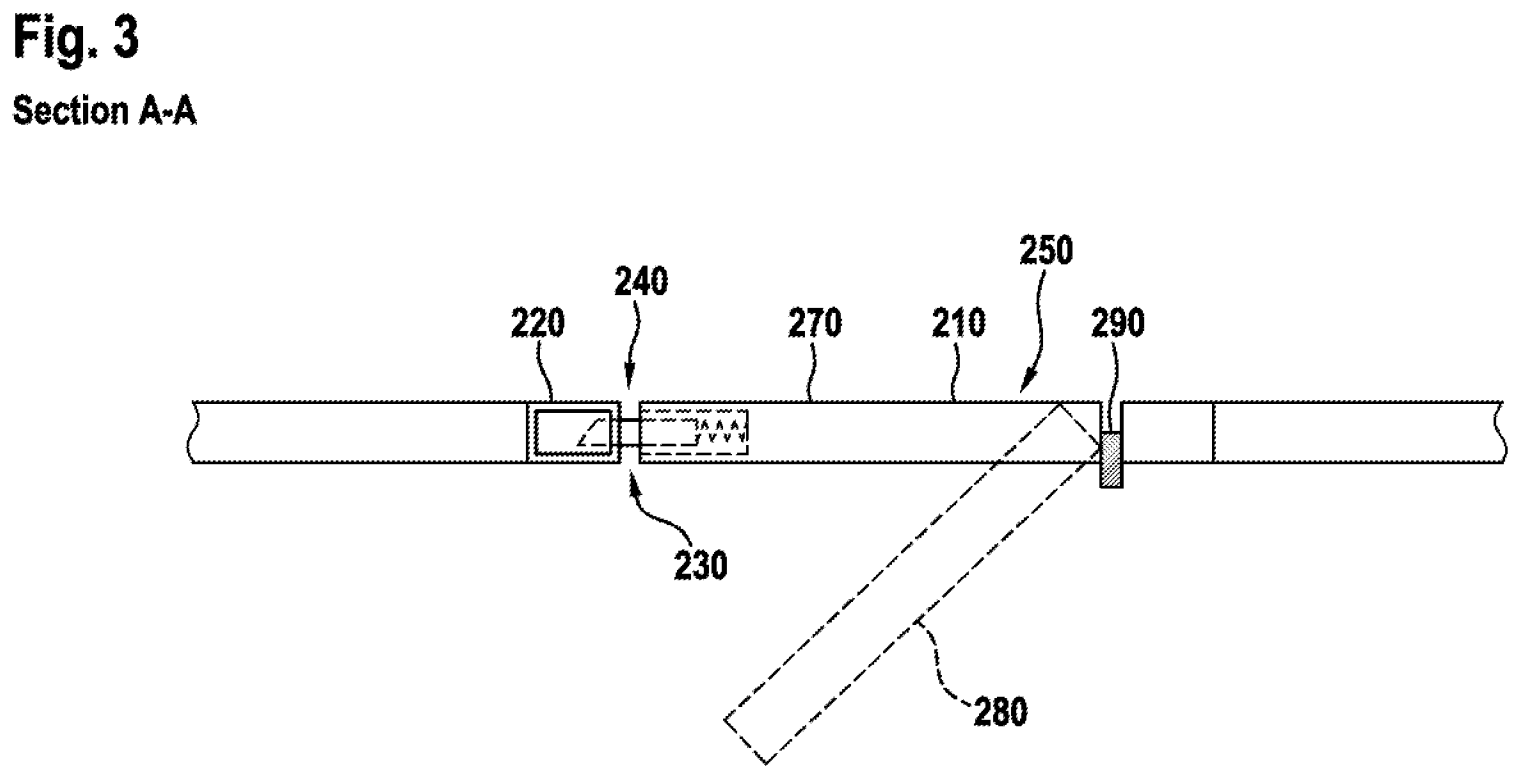

FIG. 3 shows a sectional view of illustrative door module 250 with door panel 210 in a closed position 270. As shown, door module 250 may include door panel 210, door frame 220, door locking system 230 with locking element 240, and hinges 290. In the closed position 270, door panel 210 may prevent passage through door frame 220.

If desired, locking element 240 of door locking system 230 may have at least a first and a second state. Locking element 240 may be adapted to maintain door panel 210 in closed position 270 in the first state. Locking element 240 may be adapted to release door panel. 210 from closed position 270 in the second state.

In some embodiments, locking element 240 may be located in door panel 210. In the first state, a latching element of locking element 240 may protrude from door panel 210 into door frame 220, thereby maintaining door panel 210 in closed position 270.

In some embodiments, locking element 240 may be located in door frame 220. In the first state, a latching element of locking element 240 may protrude from door frame 220 into door panel 210, thereby maintaining door panel 210 in closed position 270.

If desired, a biasing element of locking element 240 may bias the latching element into the protruding position, thereby biasing locking element 240 into the first state.

A locking element release actuator may be coupled to locking element 240. The locking element release actuator may perform a transition of locking element 240 from the first state to a second state. The transition of locking element 240 from the first state to the second state is sometimes also referred to as the release of locking element 240.

For example, the locking element release actuator may act on the latching element and/or against the biasing element such that the latching element no longer protrudes from door panel 210 if locking element 240 is located in door panel 210 or from door frame 220 if locking element 240 is located in door frame 220.

Upon the release of locking element 240, door panel 210 may rotate around an axis defined by hinges 290, thereby moving door panel 210 from closed position 270 to opened position 280. For example, door panel 210 may be manually moved, moved by a pressure difference, or by a biasing device from closed position 270 to opened position 280 upon the release of locking element 240.

Figure 4A:
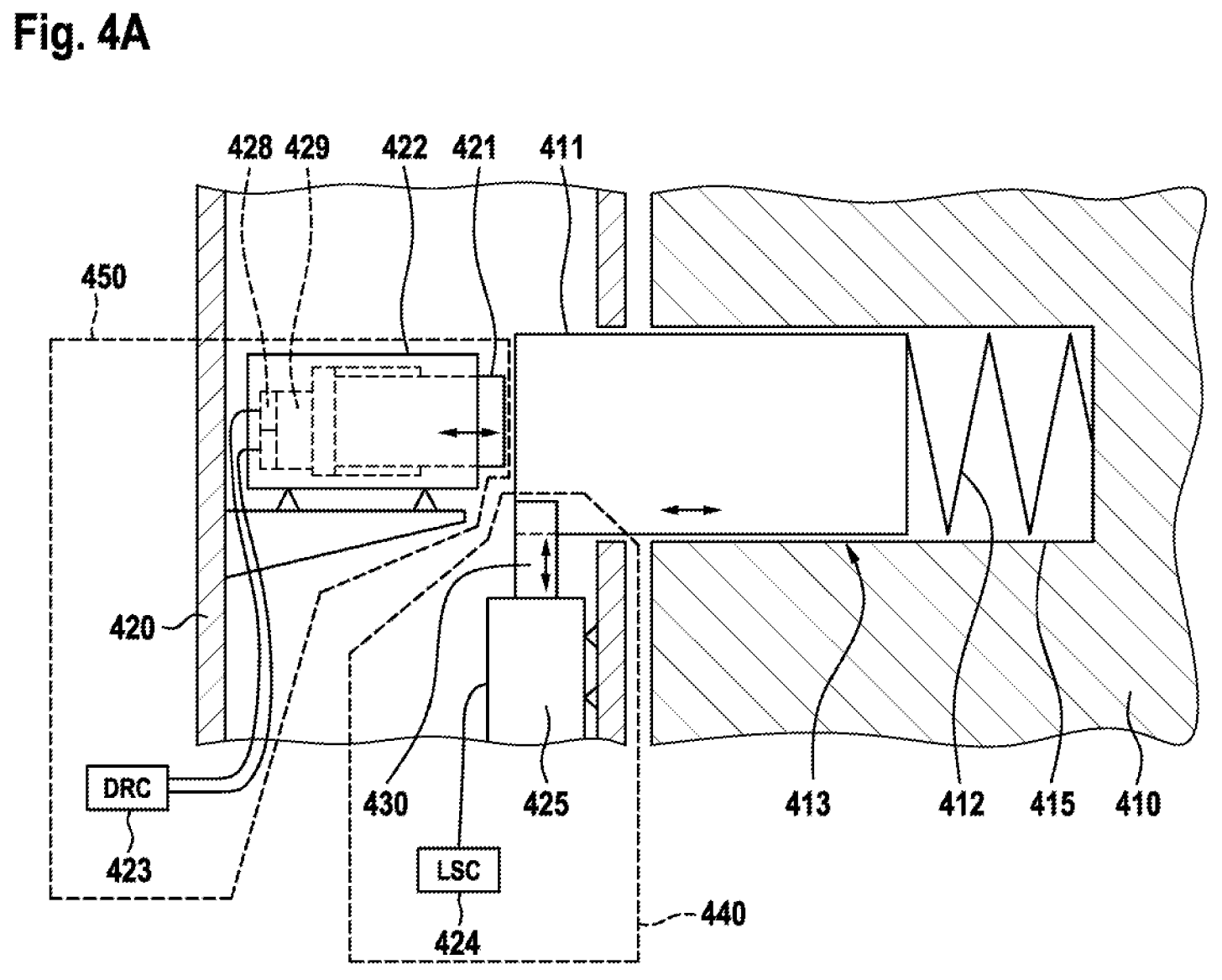

FIG. 4A is a diagram of an illustrative door locking system that includes a locking element that is in a first state in accordance with some embodiments.

As shown in FIG. 4A, the door locking system may include locking element 413, first mechanism 440, and second mechanism 450.

Locking element 413 may include latching element 411 and biasing element 412 that is arranged in pocket 415. Locking element 413 may have at least a first and a second state. In the first state, locking element 413 may be adapted to maintain door panel 410 in a closed position. In other words, biasing element 432 may bias latching element 411 in a position in which it protrudes from door panel 410 into door frame 420.

In some embodiments, locking element 413 may be located in door frame 420 and biasing element 412 may bias latching element 411 such that it protrudes from door frame 420 into door panel 410.

In the second state, an external mechanism may apply a force onto latching element 411 and/or biasing element 432 of locking element 413 such that latching element 411 no longer protrudes from door panel 410 if locking element 413 is located inside door panel 410 or latching element 411 of locking element 413 no longer protrudes from door frame 420 if locking element 413 is located in door frame 420.

As an example, a first mechanism 440 may include a door handle 750 that acts on latching element 411 and pushes latching element 411 against biasing element 412 such that latching element 411 completely recedes into pocket 415.

In some embodiments, a first mechanism 440 may include a handle, a slider that is connected with latching element 411, or any other device that allows to move latching element 411 of locking element 413 into pocket 415 and against biasing element 412.

When latching element 411 no longer protrudes from pocket 415, locking element 413 is in the second state. In the second state locking element 413 is adapted to release door panel 410 from the closed position. Thus, first mechanism 440 may enable a first movement of door panel 410 from the closed position to an opened position.

If desired, first mechanism 440 may enable a second movement of door panel 410 from the opened to the closed position. For example, a handle of the first mechanism may move door panel 410 shut against door frame 420 and the release of the handle may cause biasing element 412 to move latching element 41.1 outside of pocket 415 such that latching element 411 protrudes from door panel 410 into door frame 420, thereby transitioning locking element 413 from the second state to the first state and door panel 410 from the opened to the closed position.

If desired, first mechanism 440 may include other components and elements in addition to a handle, a sliding device, or any other device that allows to transition locking element 413 from the first state to the second state by moving latching element 411 completely inside of pocket 415. For example, first mechanism 440 may include controller 424, locking actuator 425, and blocking element 430.

In some embodiments, locking actuator 425 may act on blocking element 430 as directed by controller 424. For example, locking actuator 425 may move blocking element 430 from a retracted position in which blocking element 430 is at least partially receded inside locking actuator 425 to an extended position in which blocking element 430 is protruding from locking actuator 425 and engages with latching element 411 such that latching element 411 cannot be moved by a handle, a slider, or any other device that performs a transition of locking element 413 from the first state to the second state. If desired, controller 424 may direct locking actuator 425 to protrude or recede blocking element 430.

In some embodiments, controller 424 may include a key, a keypad, a card reader, or any other controlling device that allows to control locking actuator 425.

When blocking element 430 is protruding from locking actuator 425, blocking element 430 may engage with latching element 411. When blocking element 430 engages with latching element 411, a handle, a slider, or any other device that is attached to latching element 411 and that allows to move latching element 411 against biasing element 412 inside of pocket 415 may be blocked from moving latching element 411.

If desired, when blocking element is receding inside of locking actuator 425, blocking element 430 may no longer be engaged with latching element 411. In other words, blocking element 430 may release latching element 411, and a handle, a slider, or any other device that is attached to latching element 411 may be used to move latching element 411 against biasing element 412 inside of pocket 415, thereby enabling a movement of door panel 410 from a closed position to an opened position.

In some embodiments, the door locking system may include a second mechanism. If desired, second mechanism 450 may act on latching element 411, thereby enabling another movement of door panel 410 from the closed to the opened position.

Second mechanism 450 may be specially segregated from first mechanism 440. As shown, second mechanism 450 may include movable pin 421, locking element release actuator 422, controller 423, ignition unit 428, and gas generator 429.

If desired, second mechanism 450 may be a rapid release mechanism that releases door panel 410 from the closed position in case of an emergency. For example, second mechanism 450 may act on latching element 411 such that locking element 413 transitions from the first state into the second state.

As an example, consider the scenario in which second mechanism 450 releases door panel 410 from the closed position in case of a rapid decompression. Consider further that the door panel 410 separates two compartments of an aircraft and that a pressure sensor monitors a difference in pressure between the compartments of the aircraft. If desired, controller 423 may be coupled to the pressure sensor. In some embodiments, controller 423 may have an integrated pressure sensor.

Controller 423 may direct locking element release actuator 422 to perform the transition of the locking element from the first state to the second state when the difference in pressure between the compartments exceeds a predetermined threshold.

In some embodiments, locking element release actuator 422 may include a pyrotechnical device. If desired, locking element release actuator 422 may include any other device that is suitable for performing the transition of the locking element from the first state to the second state. For example, locking element release actuator 422 may include a solenoid.

As shown in FIG. 4A, locking element release actuator 422 includes a pyrotechnical device. When the difference in pressure between the compartments exceeds a predetermined threshold, controller 423 may send an electrical signal to ignition unit 428. Ignition unit 428 may transform the electrical energy of the signal from controller 423 into thermal energy by a chemical reaction. This thermal energy may start an immediate secondary reaction in the adjacent gas generator 429. The rate of Che gas deployment by gas generator 429 may be high enough such that movable pin 421 may be pushed into a protruding position. The projection of movable pin 421 may override biasing element 412 thereby accelerating latching element 411 into pocket 415.

Figure 4B:
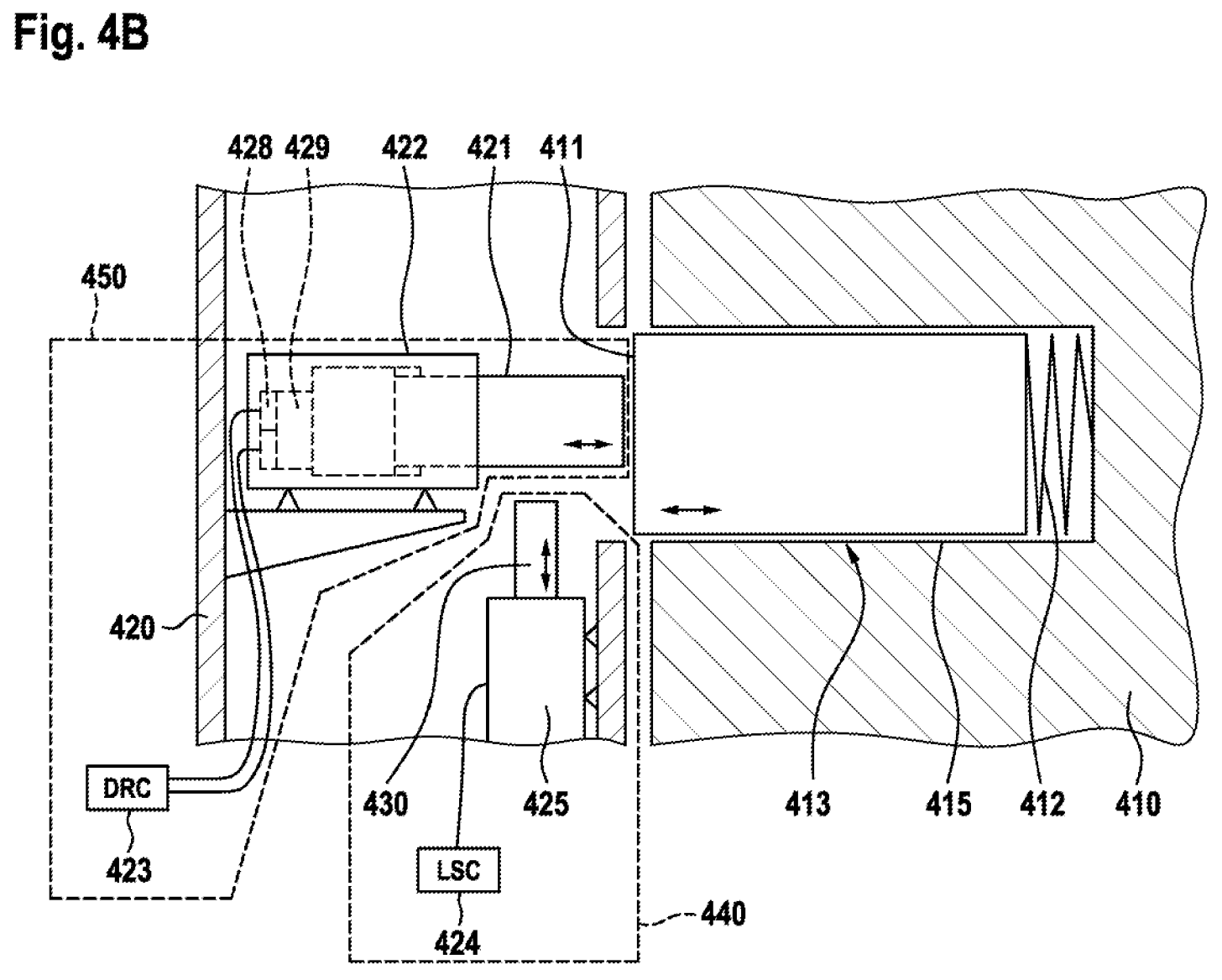

The action of second mechanism 450 is shown in FIG. 4B. In the scenario described above, latching element 411 is no longer protruding from door panel 410 into door frame 420 in case that pocket 415 is located inside door panel 410 or is no longer protruding from door frame 420 if pocket 415 is located in door frame 420. As a result, locking element 413 has transitioned from the first state to the second state. The difference in pressure between the compartments may push door panel 410 open, thereby ensuring an equalization of the pressures between the compartments.

Figure 5A:
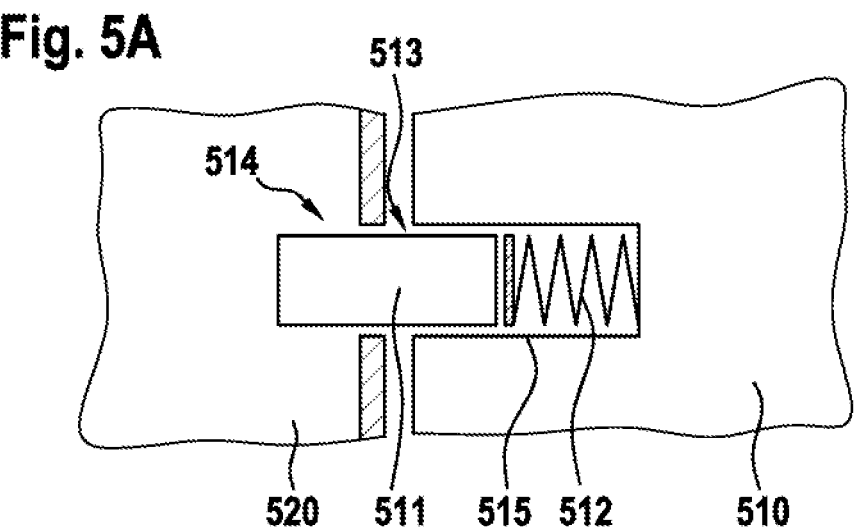
FIG. 5A is a diagram of an illustrative locking element that includes a biasing element in form of a spring in accordance with some embodiments.
Figure 5B:
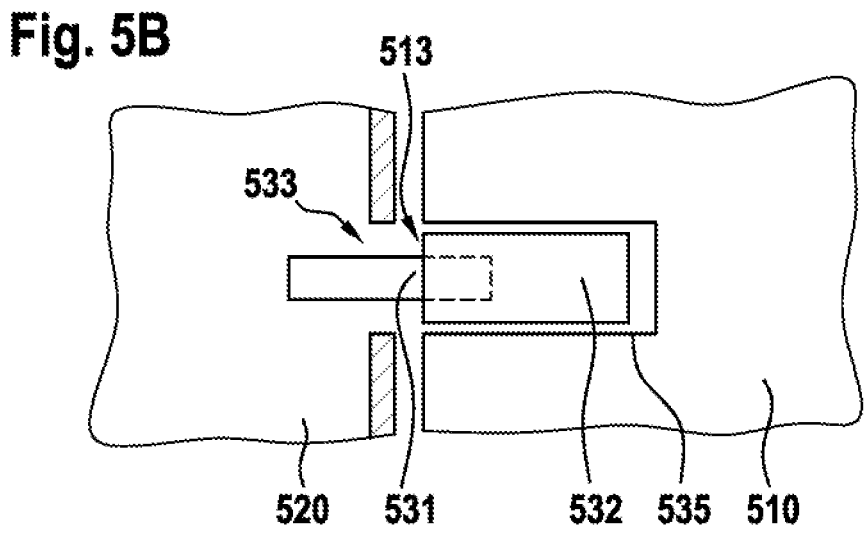
FIG. 5B is a diagram of an illustrative locking element that includes a biasing element in form of a solenoid in accordance with some embodiments.
Figure 5C:
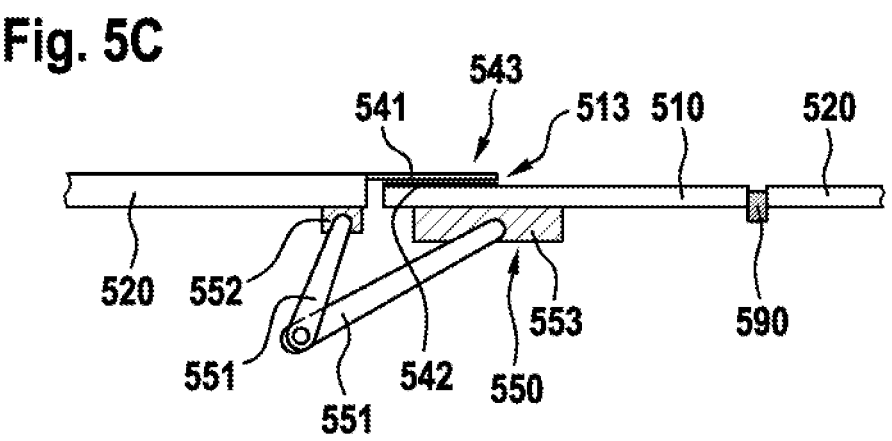
FIG. 5C is a diagram of an illustrative locking element that includes a biasing element in form of a door closer in accordance with some embodiments.

As shown in FIGS. 4A and 4B, locking element 413 may include spring 412 inside of pocket 415 and latching element 411. FIGS. 5A, 5B, and 5C show three different embodiments of a locking element.

FIG. 5A is a diagram of an illustrative locking element 513 that includes a biasing element 512 in form of a spring in accordance with some embodiments. As shown in FIG. 5A, locking element 513 may include spring bolt lock 514. Sprint bolt lock 514 may include biasing element 512 in form of a spring that is located in pocket 515 and latching element 511 in form of a bolt.

As shown in FIG. 5A, pocket 515 may be located in door panel 510 such that latching element 513 protrudes from door panel 510 into door frame 520, thereby maintaining door panel 510 in a closed position.

If desired, biasing element 512 and pocket 515 may be located in door frame 520. Thus, biasing element 512 may bias latching element 511 in a protruding position in which latching element 511 protrudes from door frame 520 into door panel 510.

FIG. 5B is a diagram of an illustrative locking element that includes solenoid bolt 533. As shown in FIG. 5B, solenoid bolt 533 may be located inside pocket 535. Solenoid bolt 533 may include coil 532 and movable pin 531. Coil 532 is sometimes also referred to as solenoid 532.

Solenoid bolt 533 may be electrically powered. For example, an electrical current flowing through coil 532 may generate a magnetic field inside of coil 532. The magnetic field inside of coil 532 may move movable pin 531 from a retracted position into a protruding position.

As shown in FIG. 5B, pocket 535 with solenoid 532 may be located in door panel 510. When located in door panel 510, the movable pin 531 may protrude from coil 532 into door frame 520.

In some embodiments, pocket 535 with coil 532 may be located in door frame 520. When an electrical current flows through coil 532, movable pin may move from the retracted position into a protruding position in which movable pin 531 protrudes from door frame 520 into door panel 510.

If desired, solenoid bolt 533 may fail closed. In other words, when no current flows through coil 532, there is no magnetic field inside coil 532, and movable pin 531 may be in a retracted position.

FIG. 5C is a diagram of an illustrative locking element 513 that includes a magnetic locking device 543 in accordance with some embodiments. As shown in FIG. 5C, magnetic locking device 543 may include electromagnet 541 and metallic plate 542. When metallic plate 542 is pushed against electromagnet 541, magnetic locking device 543 may maintain door panel 510 in a closed position based on the magnetic field created by electromagnet 541.

In some embodiments, locking element 513 may include door closer 550. Door closer 550 may bias door panel 510 into the closed position in which metallic plate 542 is in contact with electromagnet 541.

Door closer 550 may include damping device 553 and movable arms 551. One movable arm 551 may be attached to damping device 553 and the other movable arm 551 to movable arm attachment 552. Movable arms 551 may be attached to each other in a hinged connection, if desired.

In some embodiments, damping device 553 may be located on door panel 510, and movable arm attachment 552 may be located on door frame 520 or any other neighboring location next to door frame 520. If desired, damping device 553 may be located on door frame 520 or any neighboring fixed location, whereas movable arm attachment 552 may be located on door panel 510.

Door closer 550 may be mounted on any surface that enables door closer 550 to bias door panel 510 into the closed position. For example, door closer 550 may be mounted on door frame 520, on a surface above door frame 520, on a surface that is perpendicular to door frame 520, etc.

If desired, door closer 550 may include a spring that may store the energy used in the opening of door panel 510. The spring may include a compression or torsion spring. The spring may release the stored energy to close door panel 510.

If desired, door closer 550 may allow for adjustment of the strength of the spring, making it easier or more difficult to push door panel 510 open. For limiting the speed at which door panel 510 is closed, door closer 550 may use hydraulic (e.g., oil-filled) dampers inside damping device 553. In some embodiments, spring mechanisms may be used for damping. If desired, door damper 550 may be automatic.

A first mechanism may enable a movement of door panel 510 from the closed position to an opened position and another movement of the door panel 510 from the opened position to the closed position by acting on locking elements 513 of FIGS. 5A, 5B and 5C in normal mode. If desired, a second mechanism may act on locking elements 513 of FIGS. 5A, 5B and 5C in abnormal mode. For example, a second mechanism may act on locking elements 513 of FIG. 5A, 5B or 5C when an emergency release is required.

Figure 6A:
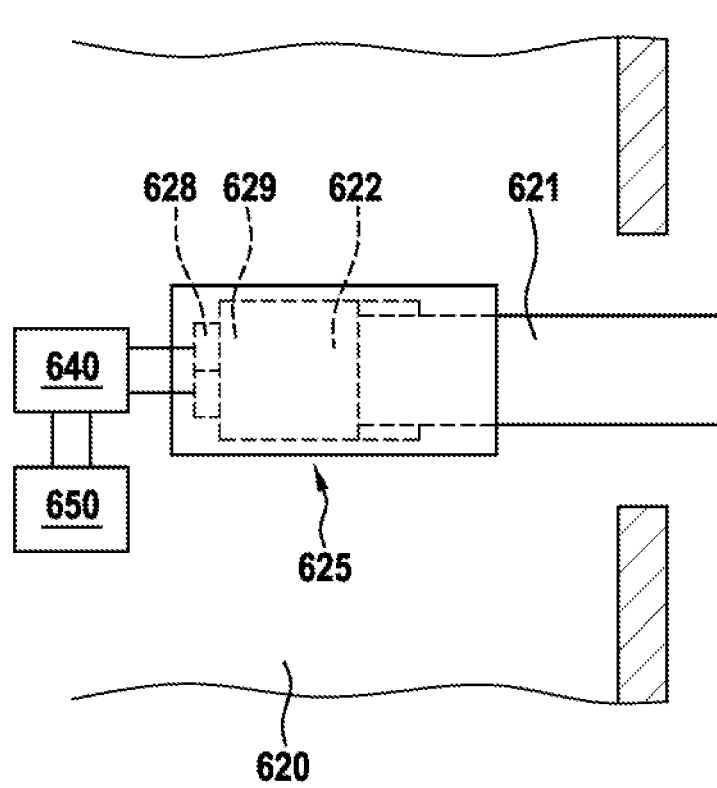
FIG. 6A is a diagram of an illustrative emergency release mechanism with a pyrotechnical device in accordance with some embodiments.
Figure 6B:
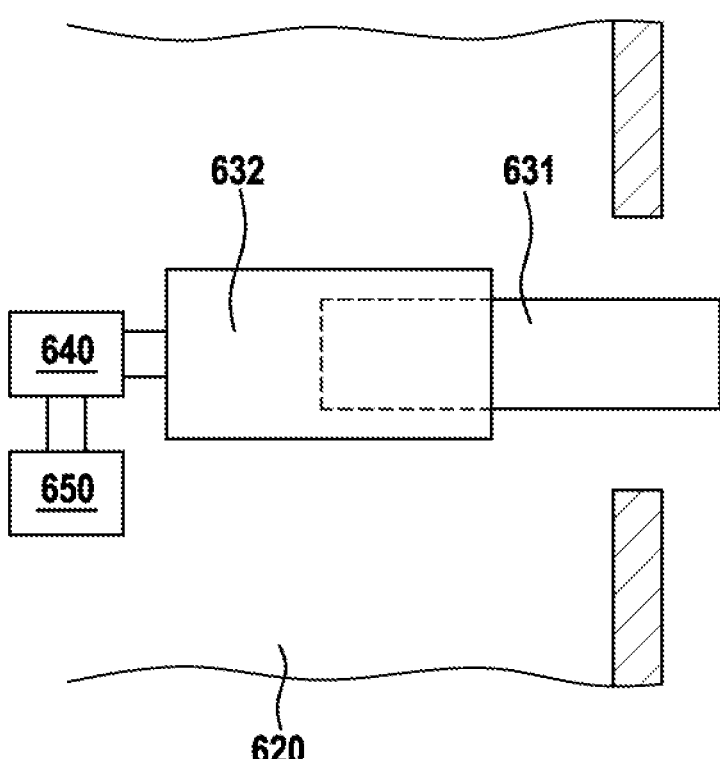
FIG. 6B is a diagram of an illustrative emergency release mechanism with a solenoid bolt in accordance with some embodiments.

FIGS. 6A and 6B are diagrams of illustrative emergency release mechanisms. The emergency release mechanisms shown in FIGS. 6A and 6B may override the respective biasing elements of locking elements 513 of FIGS. 5A, 5B or 5C, and/or any additional blocking elements (e.g., blocking element 430 of FIGS. 4A and 4B), thereby enabling a move of door panel 510 from a closed position to an opened position.

FIG. 6A is a diagram of an illustrative emergency release mechanism with a pyrotechnical device in accordance with some embodiments. As shown in FIG. 6A, the emergency release mechanism may be located in door frame 620. If desired, the emergency release mechanism may at least partially be located in a door panel.

As shown in FIG. 6A, the emergency release mechanism may include movable pin 621, pyrotechnical device 625, electrically controlled switch 640, and controller 650. In some embodiments, pyrotechnical device 625 may include locking element release actuator 622, ignition unit 628, and gas generator 629.

FIG. 6A shows movable pin 621 protruding from pyrotechnical device 625. In other words. FIG. 6A shows the second mechanism after an emergency has been detected and movable pin 621 has acted against a latching device such that the door panel can move from a closed to an opened position.

Consider the scenario in which controller 650 has detected the occurrence of an emergency. For example, a pressure sensor may monitor a difference in pressure between compartments of an aircraft that are separated by the door module, controller 650 may monitor the data from the pressure sensor, and controller 650 may have detected based on the data from the pressure sensor that a difference in pressure between those compartments exceeds a predetermined threshold. In this scenario, controller 650 may direct electrically controlled switch 640 to initiate the emergency release of the door panel.

For example, electrically controlled switch 640 may send an electrical signal to ignition unit 626. Upon receipt of the signal from electrically controlled switch 640, ignition unit 628 may transform the electrical energy of the signal into a thermal energy by a chemical reaction. This thermal energy may start a secondary reaction in the adjacent gas generator 629.

Pyrotechnical device 625 may be designed such that the rate of the gas deployment is extremely high so that movable pin 621 will be pushed into the extracted position, as shown in FIG. 6A. The projection of movable pin 621 may override a latching element, a biasing element, and/or a blocking element such that the door panel may be able to move from the closed position into an opened position.

For example, the projection of movable pin 621 may override biasing element 512 of FIG. 5A, thereby accelerating latching element 511 that keeps the door panel in a closed position into its pocket 515. As another example, the projection of movable pin 621 may override the magnetic field of solenoid 532 of FIG. 5B, thereby accelerating movable pin 531 inside of solenoid 532 such that the door panel may be able to move from the closed position into an opened position. As yet another example, the projection of movable pin 621 may override the combined force of door closer 550 and the magnetic field of electromagnet 541 of FIG. 5C that keeps the door panel in the closed position.

FIG. 6B is a diagram of an illustrative emergency release mechanism with a solenoid bolt in accordance with some embodiments. As shown in FIG. 6B, the emergency release mechanism may be located in door frame 620 or any other neighboring structure to which door frame 620 is attached. If desired, the emergency release mechanism may be located inside the door panel.

The emergency release mechanism shown in FIG. 6B may include movable pin 631, solenoid 632, electrically controlled switch 640, and controller 650. Movable pin 631 may be in a retracted position inside of solenoid 632 when no emergency is detected and it may be deployed from solenoid 632 in case of an emergency.

As an example, consider the scenario in which the door with door frame 620 separates two compartments. Consider further that the pressure difference between the two compartments exceeds a predetermined threshold. In this scenario, controller 650 may direct solenoid 632 via electrically controlled switch 640 to move movable pin 631 from the retracted into the protruding position.

For example, electrically controlled switch 640 may turn on an electrical current through solenoid 632. In response to a current flowing through solenoid 632, solenoid 632 may generate a magnetic field inside of solenoid 632. In response to the magnetic field, movable pin 631 may move from a retracted into a protruding position.

Thus, solenoid 632 may push movable pin 631 against a locking element, thereby performing the second transition of the locking element from the first state to the second state in which a related door panel may move from a closed position to an opened position.

For example, the projection of movable pin 631 may override biasing element 512 of FIG. 5A, thereby accelerating latching element 511 that keeps the door panel in a closed position into its pocket 515. As another example, the projection of movable pin 631 may override the magnetic field of solenoid 532 of FIG. 5B, thereby accelerating movable pin 531 inside of solenoid 532 such that the door panel may be able to move from the closed position into an opened position. As yet another example, the projection of movable pin 631 may override the combined force of door closer 550 and the magnetic field of electromagnet 541 of FIG. 5C that keeps the door panel in the closed position.

FIG. 7 is a diagram of an illustrative door locking system in accordance with some embodiments. As shown in FIG. 7, the door locking system may include locking element 711, first mechanism 720, and second mechanism 730.

Locking element. 711 may have at least a first and a second state. Locking element 711 may be adapted to maintain a door panel in a closed position in a first state. Locking element 711 may be adapted to release the door panel from the closed position in a second state.

First mechanism 720 may enable a first movement of the door panel from the closed position to an opened position and a second movement of the door panel from the opened to the closed position. For example, first mechanism 720 may be actuated if a person wants to open or close the door module manually. In other words, first mechanism 720 may be used in normal mode or in normal operation mode.

As shown in FIG. 7, first mechanism 720 may include power supply 721, manual unlock/lock operation mode selection module 722, indication 723, data networks 724, controller 726, locking element release actuator 725, and keypad 729. Controller 726 may include internal power supply 727 and operational, interface, and self-monitoring part 726.

Locking element release actuator 725 may be coupled to locking element 711 and perform a first transition of the locking element 711 from the first state to the second state. If desired, locking element release actuator 725 may also perform a second transition of the locking element 711 from the second state to the first state.

Controller 726 may control operation of locking element release actuator 725. Controller 726 may have internal power supply 727 to be able to operate independently of power supply 721. Internal power supply 727 may power operational, interface, and self-monitoring part 728 of controller 726. Internal power supply 727 may be electrically coupled to power supply 721, if desired.

Operational, interface and self-monitoring part 728 may be coupled to keypad 729, manual unlock/lock operation selection mode 722, indication 723, and data networks 724. For example, keypad 729 may provide a securing feature to first mechanism 720. For example, keypad 729 may provide a means for entering a pin that actuates locking element release actuator 725. Locking element release actuator 725 may only release locking element 711 if a valid key is entered into keypad 729.

In some embodiments, at least a portion of the first mechanism may be located in a door panel. If desired, at least a portion of the first mechanism may be located in the door frame, a door post, or any neighboring structure that is connected to the door frame.

In some embodiments, the door locking system of FIG. 7 may include a second mechanism 730. Second mechanism 730 may enable a third movement of the door panel from the closed to the opened position.

Second mechanism 730 may be spatially segregated from first mechanism 720. If desired, second mechanism 730 may operate independently of first mechanism 720. In other words, first, and second mechanisms may each have their own components for acting on locking element 711 and not share any components.

As shown in FIG. 7, second mechanism 730 may include power supply 731, indication 732, pressure sensor 733, controller 736, and locking element release actuator 737. Controller 736 may include release actuator driver 734 and internal power supply 735. In some embodiments, pressure sensor 733 may be integrated into controller 736, if desired.

Locking element release actuator 737 of second mechanism 730 may be coupled to locking element 711. Locking element release actuator 737 may perform a second transition of locking element 711 from the first state to the second state. In other words, locking element release actuator 737 may act on locking element 711 such that locking element 711 releases the door panel from the closed position into an opened position.

For example, pressure sensor 733 may monitor a difference in pressure between the compartments of an aircraft that are separated by a door module with locking system 711. Controller 736 that is coupled to pressure sensor 733 and to locking element release actuator 737 may direct locking element release actuator 737 to perform the second transition of locking element 711 from the first state to the second state when the difference in pressure between the compartments exceeds a predetermined threshold, in other words, locking element release actuator 737 may act on locking element 711 such that a door panel may move from a closed position to an opened position.

For example, a movable pin (e. g., movable pin 621 of FIG. 6A or movable pin 631 of FIG. 6B) may act on a latching element of locking element 711 (e.g., latching element 511 of FIG. 5A, latching element. 531 of FIG. 5B, or metallic plate 542 of FIG. 50 and/or a blocking element (e.g., blocking element 430 of FIG. 4A or 4B).

If desired, release actuator driver 734 may act on locking element actuator 737. In some embodiments, internal, power supply 735 of controller 736 may be coupled to at least one of release actuator driver 734, pressure sensor 733, or locking element release actuator 737. Internal power supply 735 may be coupled to power supply 731. Internal power supply 735 may guarantee a working condition of the second mechanism 730 in case of a problem with power supply 731.

In some embodiments, a pyrotechnical device such as pyrotechnical device 625 of FIG. 6A or a solenoid with a movable pin such as solenoid 632 with movable pin 631 of FIG. 6B may implement locking device release actuator 737.

Consider the scenario in which a door module separates compartments of an aircraft and includes a door panel and a door frame. Consider further that a door locking system controls opening of the door module. As an example, the door locking system may include a locking element such as locking element 711, a first mechanism such as mechanism 720 that is adapted to control an opening and/or closing of the door module in a first mode, which is sometimes also referred to as a normal mode, and a second mechanism such as mechanism 730 that is adapted to control an opening of the door module in a second mode, which is sometimes also referred to as an abnormal mode or an emergency release mode.

For example, second mechanism 730 may be adapted to control an opening of the door module under predetermined conditions. For example, second mechanism 730 may control the opening of the door module if a predetermined air pressure difference threshold between the compartments is exceeded. Such a predetermined air pressure difference may be based on structural specifications of the aircraft and/or on regulations.

Pressure sensor 733 may detect if such a predetermined air pressure difference threshold between the compartments is exceeded.

FIG. 8 is an exemplary flowchart 20 showing illustrative operations for operating a door locking system for a door module. The door module may separate compartments of an aircraft (e.g., door module 250 of FIG. 2 that separates compartments 102*a*, 102*b* of aircraft 100 of FIG. 1). The door module may include a door panel and a door frame (e.g., door panel 210 and door frame 220 of FIG. 2).

During operation 310, the door locking system may use a pressure sensor to monitor a difference in pressure between the compartments of the aircraft. For example, pressure sensor 733 of the door locking system of FIG. 7 may monitor a difference in pressure between compartments 102*a*, 0.1.02*b* of FIG. 1.

During operation 820, the door locking system may determine whether the difference in pressure between the compartments of the aircraft exceeds a predetermined air pressure difference threshold. For example, controller 736 of the door locking system of FIG. 7 may determine whether the difference in pressure between compartments 102*a*, 102*b* of aircraft 100 of FIG. 1 exceeds a predetermined air pressure difference threshold.

In response to determining that the difference in pressure between the compartments of the aircraft exceeds the predetermined air pressure difference threshold, during operation 830, the door locking system may use the controller to direct the second locking element release actuator of the door locking system to perform a transition of the locking element of the door locking system from a first state, wherein the locking element is adapted to maintain a door panel in a closed position, to a second state, wherein the locking element is adapted to release the door panel from the closed position.

For example, in response to determining that the difference in pressure between compartment 102*a*, 102*b* of aircraft 100 of FIG. 1 exceeds the predetermined air pressure difference threshold, the door locking system of FIG. 7 may use controller 736 to direct second locking element release actuator 737 of the door locking system to perform a transition of locking element 711 of the door locking system from a first state, in which the locking element is adapted to maintain the door panel in a closed position, to a second state, in which the locking element 711 is adapted to release the door panel from the closed position.

During operation 840, the door locking system may use the second locking element release actuator to perform the transition of the locking element from the first state to the second state. For example, the door locking system of FIG. 7 may use second locking element release actuator 737 to perform the transition of locking element 711 from the first state, in which the door panel is maintained in a closed position, to the second state, in which the door panel is free to move from the closed position to an opened position.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, door panel 210 of FIGS. 2 and 3 is attached to door frame 220 with hinges 290. In other words, door panel 210 moves from a closed position to an opened position by rotating around an axis defined by hinges 290. However, door module 250 may be a sliding door, if desired. In other words, door panel 210 may retract into door frame 220 and the neighboring structures of separation 210. For example, the door panel of a sliding door may include biasing means that bias the door panel into an opened position upon release of the locking element.

REFERENCE LIST

100 aircraft
102 fuselage

102*a*, 102*b* compartments
103 compartment separation
201 compartment separation
210 door panel
220 door frame
230 door locking system
240 locking element
250 door module
270 closed position
280 opened position
290 hinge
410 door panel
411 latching element
412 biasing element
413 locking element
415 pocket
420 door frame
421 movable pin
422 locking element release actuator
423 controller
424 controller
425 locking actuator
428 ignition unit
429 gas generator
430 blocking element
440 first mechanism
450 second mechanism
510 door panel
511 latching element
512 biasing element, spring
513 locking element
514 spring bolt lock
515 pocket
520 door frame
531 movable pin, latching element
532 solenoid
533 solenoid bolt
535 pocket
541 electromagnet
542 metallic plate
543 locking device
550 door closer
551 movable arm
552 movable arm attachment
553 damping device
590 hinge
620 door frame
621 movable pin
622 locking element release actuator
625 pyrotechnical device
628 ignition unit
629 gas generator
631 movable pin
632 solenoid
640 electrically controlled switch
650 controller
711 locking element
720 first mechanism
721 power supply
722 manual unlock/lock operation mode selection
723 indication
724 data networks
725 locking element release actuator
726 controller
727 internal power supply
728 operational, interface, and self-monitoring part.
729 keypad 730 second mechanism
731 power supply
732 indication
733 pressure sensor
734 release actuator driver
735 internal power supply
736 controller
737 locking element release actuator
800 flowchart
810, 820, 830, 840 operation.

What is claimed is:

1. A door locking system for a door module that is configured to separate compartments of an aircraft and that includes a door panel and a door frame, the door locking system comprising:
   a locking element having at least a first state and a second state, wherein in the first state the locking element is protruded and protrudes between the door panel and the door frame to maintain the door panel in a closed position, and wherein in the second state the locking element is retracted and does not protrude between the door panel and the door frame to enable the release of the door panel from the closed position;
   a first mechanism comprising a handle, the first mechanism enables a first movement of the door panel from the closed position to an opened position by the handle of the first mechanism acting on the locking element to retract the locking element from protruding between the door panel and the door frame and thereby transition the locking element from the first state to the second state, and the first mechanism enables a second movement of the door panel from the opened position to the closed position,
   the first mechanism further comprising a first locking element release actuator, the first locking element release actuator is coupled to the locking element and when actuated the first locking element release actuator allows the locking element to be transitioned by the handle of the first mechanism from the first state to the second state; and
   a second mechanism that enables a third movement of the door panel from the closed position to the opened position by the second mechanism acting on the locking element, wherein the second mechanism is spatially segregated from the first mechanism and operates independently of the first mechanism, the second mechanism comprising
      a second locking element release actuator that is coupled to the locking element and when actuated the second locking element release actuator retracts the locking element from protruding between the door panel and the door frame and thereby performs a transition of the locking element from the first state to the second state,
      a pressure sensor configured to monitor a difference in pressure between the compartments of the aircraft, and
      a controller that is coupled to the pressure sensor and to the second locking element release actuator and that actuates the second locking element release actuator to perform the transition of the locking element from the first state to the second state when the difference in pressure between the compartments exceeds a predetermined threshold.

2. The door locking system of claim 1, wherein the locking element further comprises:
   a latching element; and
   a biasing element that biases the latching element such that the locking element is in the first state.

3. The door locking system of claim 2, wherein the locking element further comprises:
   at least one of a spring bolt lock, a solenoid bolt, or an electromagnetic lock.

4. The door locking system of claim 2, wherein the biasing element has at least one movable pin comprised of a spring bolt or a solenoid bolt, that fails closed in a condition where the movable pin is in a retracted position.

5. The door locking system of claim 1, wherein the first mechanism further comprises:
   a keypad for entering a pin that actuates the first locking element release actuator.

6. The door locking system of claim 1, wherein the second mechanism further comprises:
   a power supply that is coupled to at least one of a release actuator driver, the pressure sensor, or the second locking element release actuator.

7. The door locking system of claim 1, wherein the second locking element release actuator further comprises:
   a movable pin; and
   at least one of a solenoid or a pyrotechnical device, wherein the at least one of the solenoid or the pyrotechnical device pushes the movable pin against the locking element, thereby performing the transition of the locking element from the first state to the second state.

8. The door locking system of claim 7, wherein the pyrotechnical device further comprises:
   a gas generator; and
   an ignition unit that deploys a gas in the gas generator, wherein the gas pushes the movable pin against the locking element.

9. The door locking system of claim 8, wherein the ignition unit receives a trigger signal from the controller and performs a chemical reaction that transforms an electrical energy associated with the trigger signal into thermal energy.

10. The door locking system of claim 9, wherein the ignition unit uses the thermal energy to start a secondary reaction that deploys the gas.

11. The door locking system of claim 7, wherein a current through the solenoid generates a magnetic field that pushes the movable pin against the locking element.

12. The door locking system of claim 11, further comprising:
   an electrically controlled switch that receives a trigger signal from the controller and enables a flow of the current through the solenoid based on the trigger signal.

13. A door module comprising a door locking system of claim 1, wherein at least a portion of at least one of the first mechanism or the second mechanism is in the door panel.

14. The door module of claim 13, wherein at least a portion of at least one of the first mechanism or the second mechanism is in the door frame.

15. A method for operating a door module that is configured to separate compartments of an aircraft and that includes a door panel, a door frame, and a locking element, the locking element having at least a first state and a second state, and in the first state the locking element being protruded between the door panel and the door frame to maintain the door panel in a closed position and in the second state the locking element being retracted and not protruding between the door panel and the door frame to enable the release of the door panel from the closed position, the method comprising:

enabling, by a first mechanism, a first movement of the door panel from the closed position to an opened position by a handle of the first mechanism acting on the locking element to retract the locking element from protruding between the door panel and the door frame and thereby transition the locking element from the first state to the second state and enabling, by the first mechanism, a second movement of the door panel from the opened position to the closed position, the first mechanism further including a first locking element release actuator that is coupled to the locking element and that when actuated allows the locking element to be transitioned by the handle of the first mechanism from the first state to the second state;

enabling, by a second mechanism acting on the locking element, a third movement of the door panel from the closed position to the opened position, the second mechanism including a second locking element release actuator that is coupled to the locking element and that when actuated retracts the locking element from protruding between the door panel and the door frame and thereby performs a transition of the locking element from the first state to the second state, wherein the second mechanism is spatially segregated from the first mechanism and operates independently of the first mechanism;

using a pressure sensor to monitor a difference in pressure between compartments of an aircraft;

determining whether the difference in pressure between the compartments of the aircraft exceeds a predetermined air pressure difference threshold;

in response to determining that the difference in pressure between the compartments of the aircraft exceeds the predetermined air pressure difference threshold, using a controller to direct the second locking element release actuator to perform a transition of the locking element from the first state to the second state; and actuating the second locking element release actuator to perform the transition of the locking element from the first state to the second state.

*    *    *    *    *